C. A. V. CARLSSON.
REFRIGERATING APPARATUS.
APPLICATION FILED NOV. 6, 1913.
1,117,786.
Patented Nov. 17, 1914.
7 SHEETS—SHEET 1.
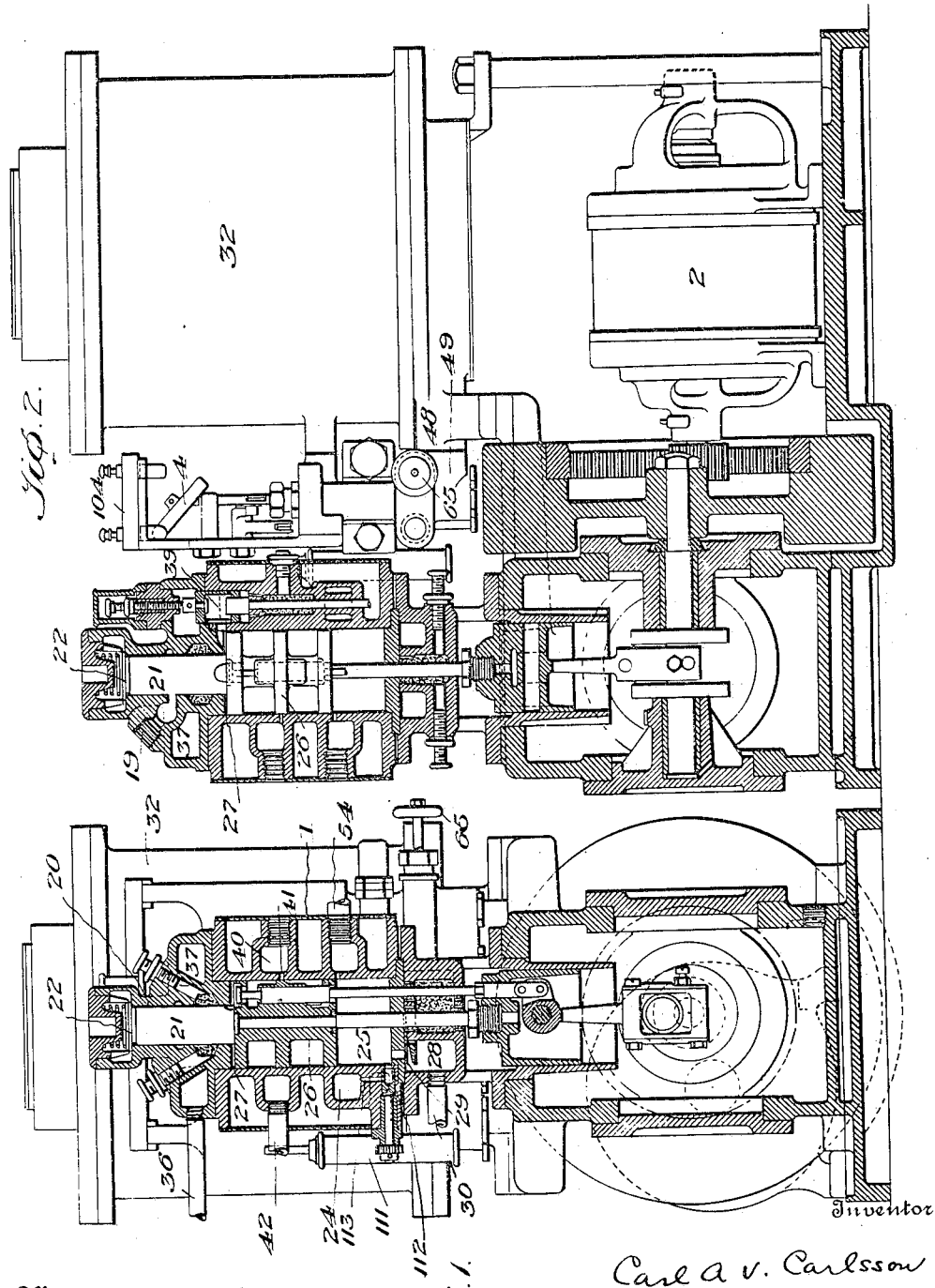

C. A. V. CARLSSON.
REFRIGERATING APPARATUS.
APPLICATION FILED NOV. 6, 1913.
1,117,786.
Patented Nov. 17, 1914.
7 SHEETS—SHEET 2.
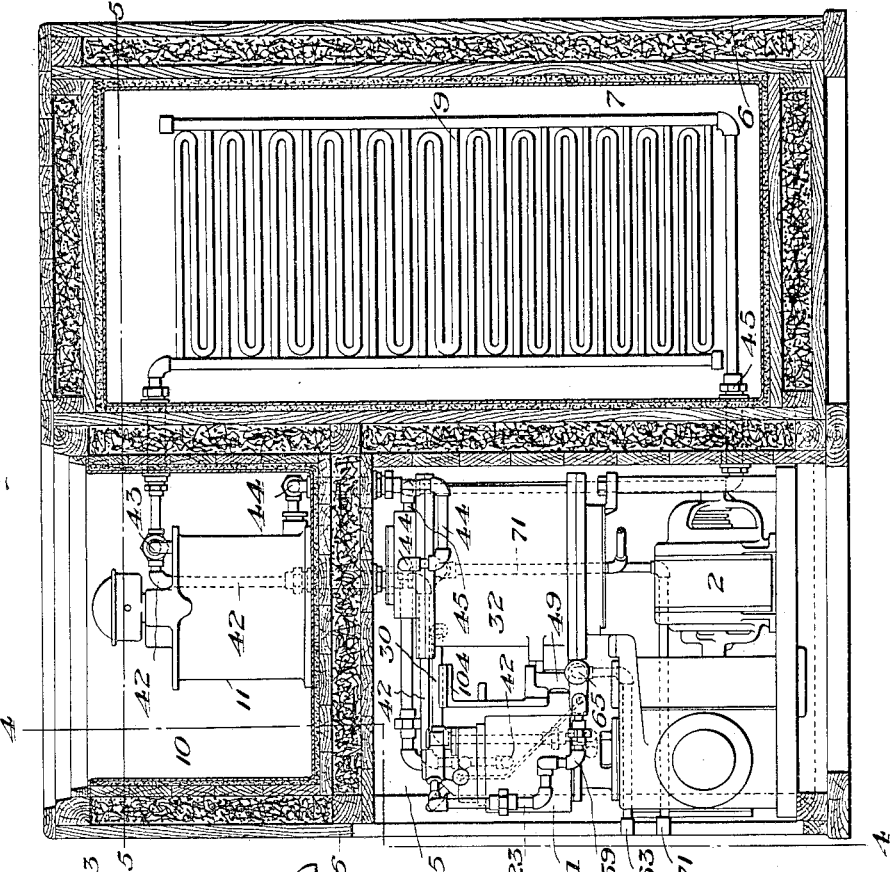

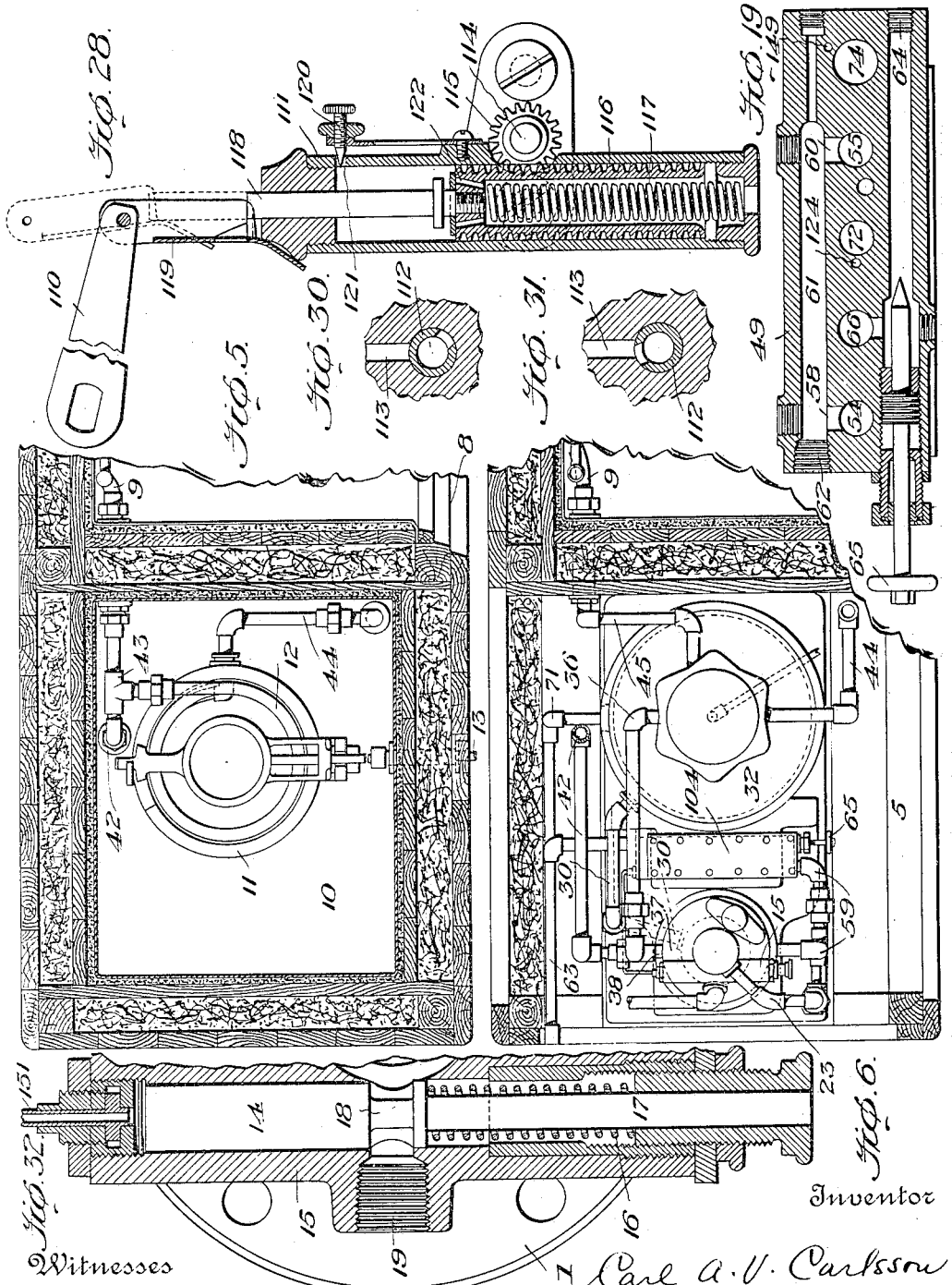

C. A. V. CARLSSON.
REFRIGERATING APPARATUS.
APPLICATION FILED NOV. 6, 1913.
1,117,786.
Patented Nov. 17, 1914.
7 SHEETS—SHEET 4.
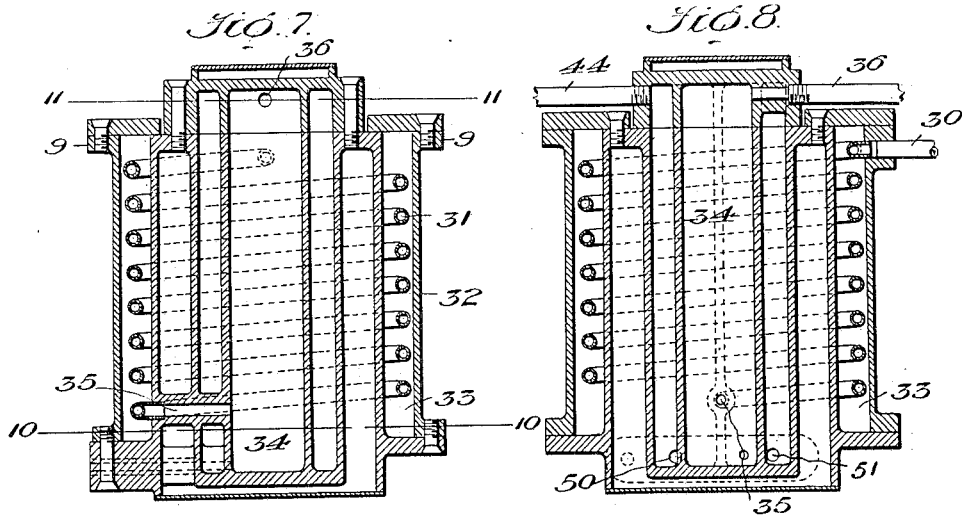
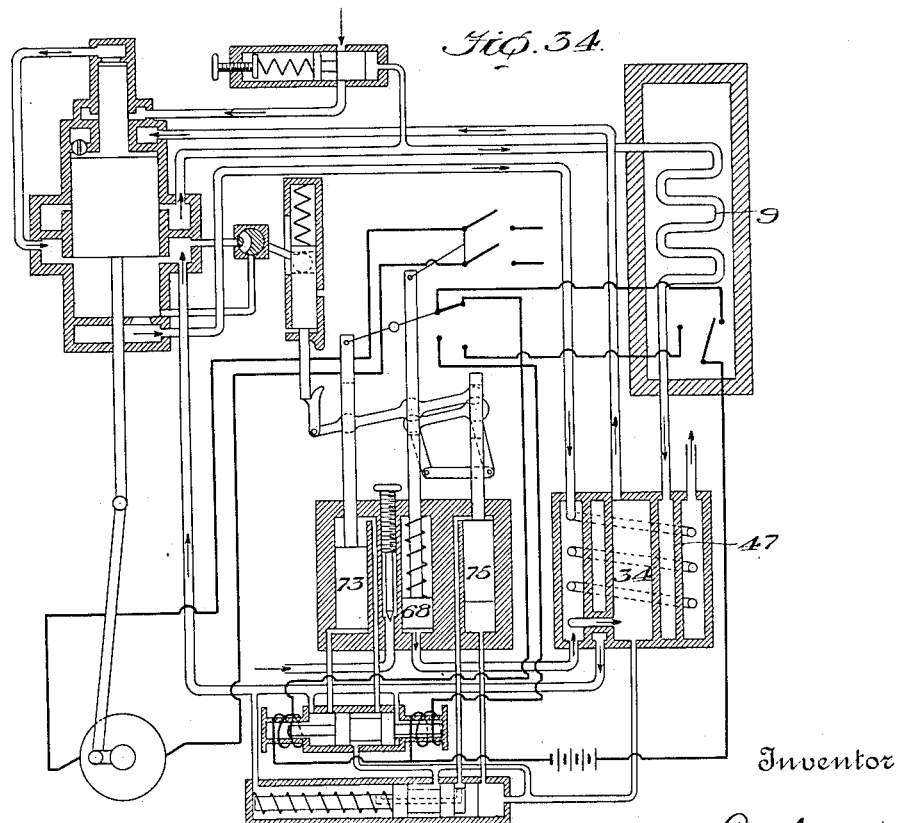

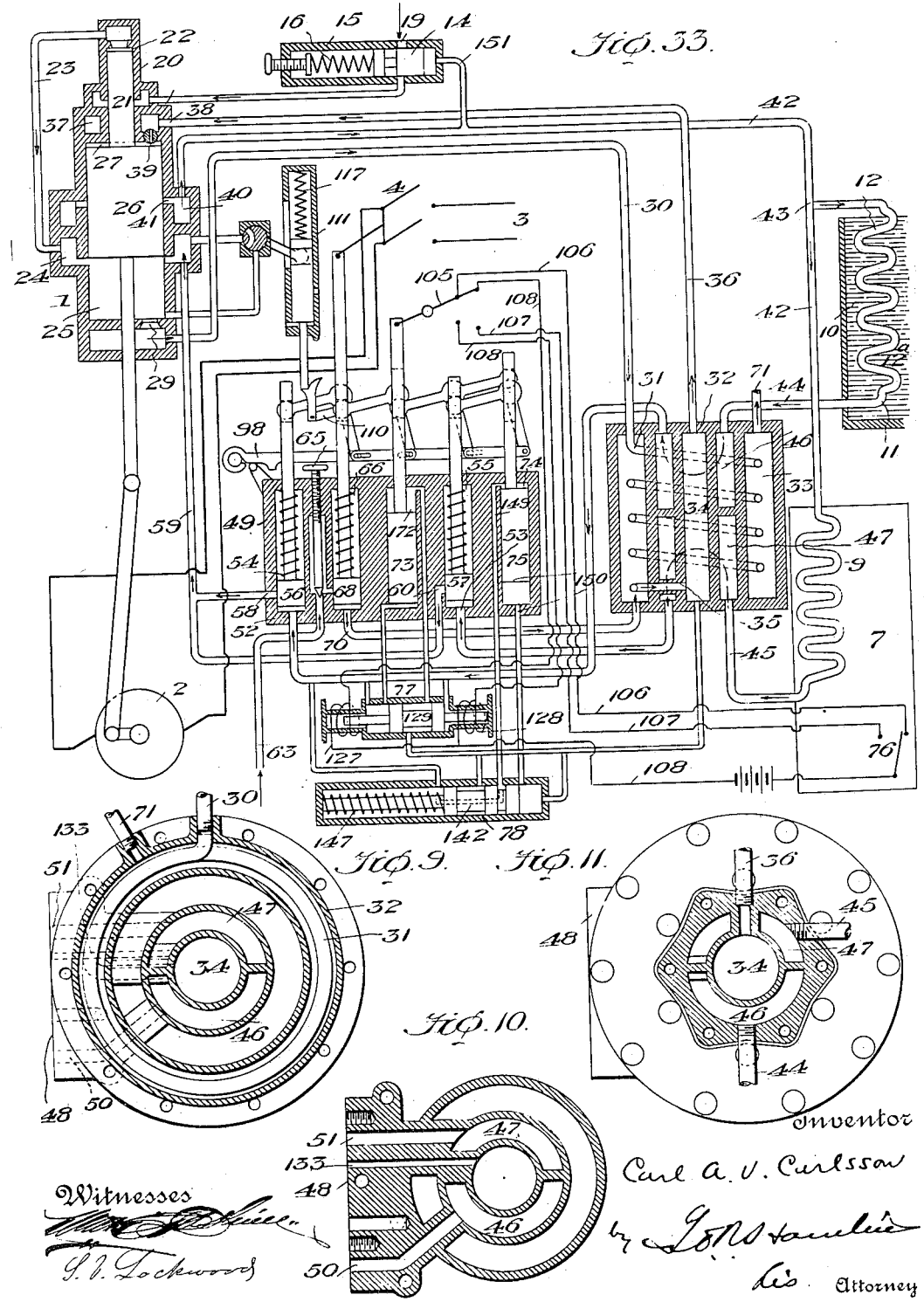

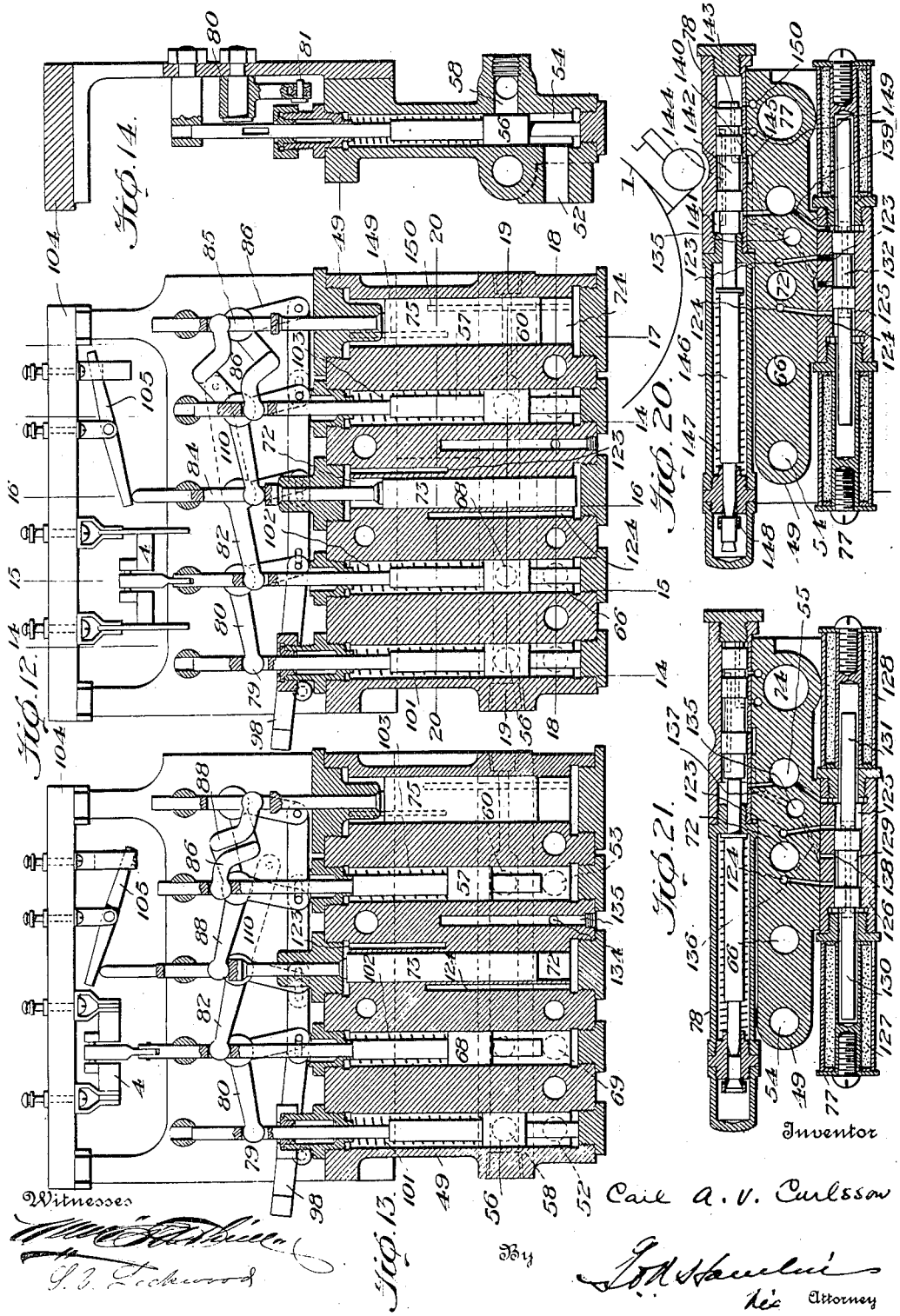

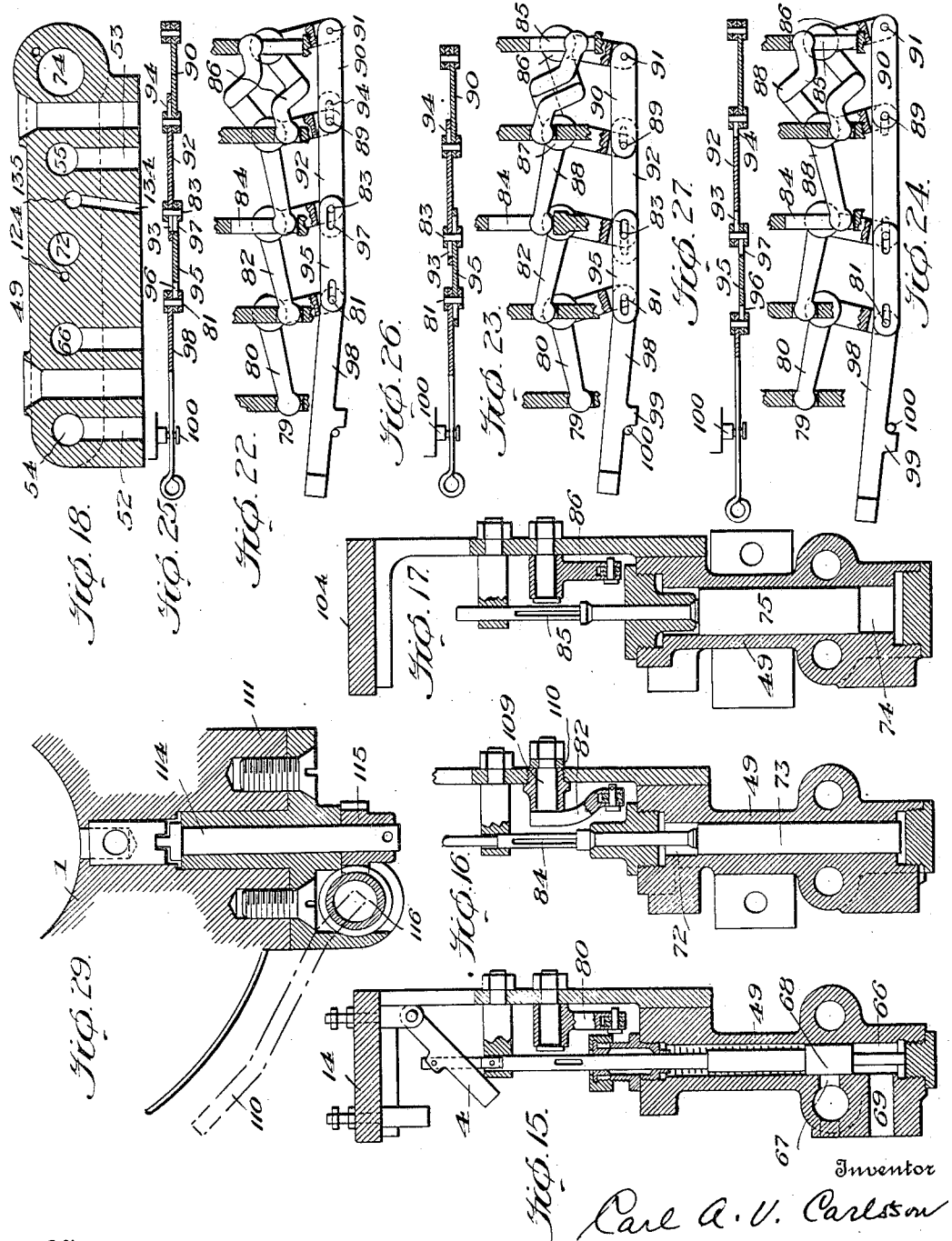

UNITED STATES PATENT OFFICE.

CARL A. V. CARLSSON, OF WASHINGTON, DISTRICT OF COLUMBIA, ASSIGNOR OF ONE-FOURTH TO CLEMENT J. CAREW, OF FRANKLIN, PENNSYLVANIA.

REFRIGERATING APPARATUS.

1,117,786.       Specification of Letters Patent.       Patented Nov. 17, 1914.

Application filed November 6, 1913. Serial No. 799,494.

*To all whom it may concern:*

Be it known that I, CARL A. V. CARLSSON, a citizen of the United States, residing at Washington, District of Columbia, have invented certain new and useful Improvements in Refrigerating Apparatus, of which the following is a specification.

This invention relates to refrigerating systems.

One of the general objects of the present invention is the provision of an improved refrigerating system, preferably adapted to be wholly self-contained within a refrigerator case, whether stationary or portable, whose successful operation will be independent of the use of natural or artificial ice, the manufacture of artificial ice, or the use of chemicals such, for instance, as ammonia, carbonic acid or sulfur dioxid, thereby avoiding the uncleanliness and danger of food and air contamination within and without the refrigerator, which are incident to such systems.

Another object is to provide an improved refrigerating system by which a lower temperature and cleaner and drier air is obtained than is possible where natural or artificial ice is employed.

A further object is the provision of an improved automatic refrigerating system which, once started, will automatically continue in operation, without requiring attention, so long as supplied with motive power.

The present refrigerating system utilizes the well known principle of compressing air, cooling it, preferably by water, to reduce its high temperature, expanding the air, using its expansive force to assist in the operation of the compressing device, which may be a motor driven air compressor, and utilizing the expanded and, consequently, very greatly cooled air as a refrigerant.

In a refrigerating system of the character set forth, an "air pressure difference" exists between the "high pressure air," which may be 150 lbs. pressure and, say, 200° F. temperature as it leaves the compressor and the "low pressure air" which, after being cooled down to, say, 75° F. and passed through an expander, is further cooled down to, say, minus 35° F, and, say, 60 lbs. pressure, and is thus forced out into the system to perform its cooling function on the refrigerating chamber or device. The performance of such cooling function raises the temperature of the low pressure air to, say, zero.

A novel feature of the present invention is the automatic control of the operation of the air compressor and expander by the utilization of the "air pressure difference" aforesaid.

Another novel feature is the combination with a power operated refrigerating system, of a thermostatic controller which insures the maintenance of the desired or necessary refrigerating or cooling temperature, and more particularly, the combination with the refrigerating system which utilizes the cooling action of compressed and expanded air, of a thermostatic controller adapted to the aforesaid purpose.

Further, the invention possesses novelty in an automatic thermostatic control of the circulation of the cooling water in an automatic refrigerating system; and still further, in an automatic thermostatic control of both the water circulation and the air circulation, whereby both are substantially simultaneously stopped or started by the action of said thermostatic controller, when used in a refrigerating system whose cooling action is dependent on the compression, cooling and expansion of air.

The invention has for a further novel feature, in an automatically controlled refrigerating system, an ice cream freezer which derives its refrigeration from the compression, cooling and expansion of air and which has a manual controller by which the air and water circulation effecting the refrigeration in said ice cream freezer may be started or stopped without interfering with the operation of the general refrigerating system and, more particularly, in combining such manual control with the automatic control of the refrigerating system, whereby the same controlling valve is used for the water circulation of the general system and of the ice cream freezer.

The invention consists, further, in automatically acting maintainer means adapted, independent of the thermostatic control, to reëstablish the air pressure difference necessary or requisite to the operation of the system when such pressure difference might, through leakage or other cause, be not maintained.

It consists, further, in a combined thermostatic and air pressure difference control of the air compressor, whereby upon a temperature change or air pressure difference change between predetermined limits, the air compressor will be started.

Another feature of the invention is an improved "unloader" for the air compressor which is automatically operated whenever the air compressor is started either manually or by thermostatic control or, by the pressure difference maintainer.

A further feature of the present invention is an automatic air primer controlled by the air pressure and adapted to prime the compressor when the low pressure air drops below a given pressure.

The invention consists, still further, first, in an improved combined air compressor and expander; second, in the particular unloader employed therefor; third, in the novel valved motor controller and its system of levers; fourth, in the particular air pressure difference maintainer employed.

The above recital of the objects and nature of the invention is to be deemed as illustrative, and not restrictive, of the scope of the invention.

In the following specification I have set forth an embodiment of the invention which illustrates the mode of operation thereof, but such is to be deemed as illustrative, and not restrictive, of the scope of the invention.

In the accompanying drawings: Figure 1 is a vertical section through the air compressor, the controlling mechanism and cooling pot and motor being in the background; Fig. 2, a vertical section through the air compressor and substantially at right angles to Fig. 1, showing the motor, controlling means, and cooling pot in elevation; Fig. 3, a vertical section through a portable refrigerator, showing the parts and mechanisms in position; Fig. 4, a section on line 4—4, Fig. 3; Fig. 5, a horizontal section partly broken away, on line 5—5, Fig. 3; Fig. 6, a view like Fig. 5 on line 6—6, Fig. 3; Fig. 7, a vertical section through the cooling pot; Fig. 8, a section at right angles to Fig. 7; Fig. 9, a horizontal section on line 9—9, Fig. 7; Fig. 10, a similar view on line 10—10, Fig. 7; Fig. 11, a similar view on line 11—11, Fig. 7; Fig. 12, a vertical section through the valved motor controller, showing the parts when the system is idle; Fig. 13, a view like Fig. 12 with the pressure difference controller piston and the ice cream freezer valve in normal position, the temperature piston and the air and water valves being in raised position, i. e., with the system working due to thermostatic control; Fig. 14, a section on line 14—14, Fig. 12; Fig. 15, a section on line 15—15, Fig. 12; Fig. 16, a section on line 16—16, Fig. 12; Fig. 17, a section on line 17—17, Fig. 12; Fig. 18, a section on line 18—18, Fig. 12; Fig. 19, a section on line 19—19, Fig. 12; Fig. 20, a section on line 20—20, Fig. 12, with the temperature valve in its lower position; Fig. 21, a view like Fig. 20, but with the air pressure difference maintainer shifted and the temperature valve shifted; Fig. 22, a detail, partially sectional view of the levers and stems when in the position shown in Fig. 12; Fig. 23, a similar view showing these parts when in the position shown in Fig. 13; Fig. 24, a view of these parts as they appear when the ice cream freezer starter bar has been moved; Fig. 25, a detail section through the links and starter bar when in the position shown in Fig. 22; Fig. 26, a similar view of these parts when in the position shown in Fig. 23; Fig. 27, a similar view of these parts when they are in the position shown in Fig. 24; Fig. 28, a detail longitudinal section of the means for operating the unloader valve for starting for the air compressor when in position; Fig. 29, a horizontal section through the means for operating the unloader valve; Fig. 30, a detail of the unloader valve when in normal position; Fig. 31, a similar view of said valve when opened for starting the compressor; Fig. 32, a longitudinal detail section through the air primer valve; Fig. 33, a diagrammatic view of the complete refrigerating system and controlling means therefor; and Fig. 34, a view like Fig. 33, but showing how the ice cream freezer and its controlling means may be omitted.

The air compressor 1 (Figs. 1 to 4 and 33) is driven through gearing by an electric motor 2 which derives electric current from mains 3 and is started or stopped by an electric switch 4, the latter being automatically controlled by means described hereinafter.

The air compressor 1, its motor 2 and the controlling and air cooling means, are contained within a compartment 5 of the refrigerator 6 or, they may be located outside the refrigerator in large installations, but where the invention is embodied in a portable refrigerator such as commonly used for domestic purposes, the entire refrigerating system will ordinarily be self-contained with the refrigerator 6.

The refrigerator 6 has a refrigerating or food chamber 7 having door opening 8 (Fig. 5). A refrigerating coil 9 is contained within chamber 7. Preferably, there is another compartment 10 in which is an ice cream freezer 11 of any suitable construction, having a refrigerating coil 12 which is used in lieu of ice. Brine 12ᵃ (Fig. 33) is used in the ice cream freezer for immersion of the coil 12. Expanded and cold air circulated in coils 9 and 12 by the air compressor, affords the requisite low temperatures for the chamber 7 and the ice cream freezer 11. The ice cream freezer is manually rotatable, in the usual manner, by a hand crank applied to a shaft 13 (Figs. 4 and 5) which protrudes from the refrigerator 6. I do not limit myself to the use of the ice cream freezer, as the refrigerating system may be employed without it, as subsequently explained in connection with Fig. 34.

The air compressor 1 has a feeding or priming valve 14 which is contained within a casing 15 (Figs. 6, 32 and 33) and is actuated by a spring 16 surrounding its stem 17 which, when the system is started, or when more priming air is required by the compressor, keeps the inlet neck 18 opposite the air inlet port 19, whereby atmospheric air is admitted into priming cylinder 20, there to be initially compressed by priming piston 21 and forced past valve 22 into pipe 23 (Figs. 3, 6, and 33) and suction chamber 24, into compression cylinder 25 below piston 26. The expansion part of the cylinder is shown at 27.

*Air circulation and cooler.*—The compressed air in cylinder 25 is forced out into chamber 28 through valve 29 and passes by pipe 30 to the coil 31 of the cooling pot 32 (Figs. 7 to 9). The space 33 contains water which is circulated and controlled as set forth hereinafter. The cooling pot has a central well 34 to which the coil 31 connects at 35. The compressed, but now cooled, air passes from the cap of the cooling pot by a pipe 36 which joins the expander head 37 of the air compressor at 38 (Figs. 1 and 6). When the piston 26 descends, the air passes from 37, past valve 39 into expansion cylinder 27 where it is very greatly expanded. The expanded air finally enters exhaust ring 40 through port 41. From ring 40 the expanded cold air passes into a pipe 42 (Figs. 1, 3, 4, 5, 6) which leads upwardly into the chamber 10 where it is provided with a T 43 having a branch connected to ice cream freezer coil 12 and another branch joined to refrigerating coil 9. The return from coil 12 is by pipe 44 to the cap of cooling pot 32 (Figs. 3, 4, 5 and 6 to 11) and into the compartment 46 on one side of well 34. Coil 9 has its return pipe 45 leading into the cap and to a compartment 47 on the other side of well 34. The compartments 46 and 47 are out of communication, so that the air circulation through coils 9 and 12 may be independently controlled, as will appear hereinafter.

*Motor controller.*—Suitably bolted or screwed to the flat lower side 48 of the cooling pot, is the shell or casing 49 of the motor controller, the latter containing (Figs. 12 and 13) the several pistons or valves which control the air and water circulation, the water supply, the battery switch and the switch 4 of motor 2.

Referring to Figs. 3, 8, 9, 10, 11, 18 and 33, the cooling pot has ports 50 and 51 leading from compartments 46 and 47 and opening out through the face of part 48. The block or casing 49 has ports 52 and 53, respectively communicating with ports 50 and 51, the former leading to cylinder 54 and the latter to cylinder 55. In cylinder 54 is a piston valve 56 which controls the return circulation of the expanded cooling air from ice cream freezer coil 12. A piston valve 57 in cylinder 55 controls the return circulation of expanded cooling air from refrigerating coil 9. When the piston valve 56 is raised, which is accomplished manually as will appear hereinafter, a port 58 is uncovered and the expanded cold air flows from ice cream freezer coil 12, through the cooling pot, past valve 56 and into a pipe 59 (Figs. 3, 4 and 6) which conducts it to chamber 24 whence it passes into a compression cylinder 25 for re-compression. When the piston valve 57 is raised, which is accomplished automatically through thermostatic control, as will appear later, the port 60 (Figs. 12, 13 and 19) is uncovered. This port communicates with the same passage 61 in block 49 as does the port 58, and, therefore, once the valve 57 is raised, as in Fig. 13, the cool expanded air from coil 9 passes into pipe 59 which is attached to pipe 62, Fig. 19. If the valve 56 is in its lowered position, Figs. 12, 13 and 33, there will be no circulation of air in coil 12 and consequently, cooling action will not take place, to any appreciable degree in the ice cream freezer. Similarly, when the valve 57 is in its lower position (Figs. 12 and 33) there is no circulation in the refrigerating coil 9 and consequently, the temperature in the refrigerating chamber 7 will begin to rise which, as will appear presently, will result in the automatic raising of valve 57 by a thermostatic control.

Referring to Figs. 3, 4, 6, 9, 10, 19 and 33, the water employed for cooling the air in the cooling pot 32 enters through a pipe 63 connected at 64 to block 49. A hand valve 65 is conveniently arranged to be set to control the volume of water, but is thereafter not disturbed as the water control is automatic. In the block 49 is a water cylinder 66 which receives its supply of water through port 67. In said cylinder is water control piston valve 68 which, when in the lower position shown in Figs. 12, 15 and 33, prevents the passage of water to the cooling pot 32, but when said valve is raised, as shown in Fig. 13, the water passes from port 67 through cylinder 66, port 69, and port 70 in block 48 of the cooling pot, thence into the cooling space 33 and finally out through pipe 71 to the sewer or any other outlet.

The block 49 has a cylinder 72 in which operates a temperature piston 73 which controls the operation of water valve 68 and air valve 57. In another cylinder 74 is a pressure difference piston 75 which is also adapted to operate the valves 68 and 57.

The piston 73 is controlled by any suitable thermostat 76 (Fig. 33) and electromagnetic valve 77 Figs. 20, 21, 33). The thermostat is located in refrigerating chamber 7, whereby an average temperature between predetermined high and low temperatures is maintained in said chamber by reason of the starting and stopping of the motor 2, with consequent control of the compressor, due to the closing and opening of switch 4 by piston valve 68 which, in turn, is operated under the control of electromagnetic valve 77.

The pressure difference piston 75 is controlled by a pressure difference maintainer 78 (Figs. 20, 21 and 33) which automatically acts when the minimum predetermined air pressure difference between the high pressure air in the pipe 30 and the low pressure air in pipe 42 is exceeded, to thereupon open valves 68 and 57, start the motor 2, and again build up the air pressure difference.

Referring to Figs. 12 to 27, the stem of piston valve 56 is raised through its co-operation at 79 with one arm of a bell crank lever 80 whose bifurcated lower end carries a pin 81. Piston valve 68 is raised by a suitably pivoted bell crank lever 82 which has a pin 83. The stem of temperature piston 73 has an elongated slot 84 and the stem of pressure difference piston 75 has an elongated slot 85. The stem of piston valve 57 is raised by a bell crank lever 86 which is suitably pivoted. Pivoted at 87 is a three-armed lever 88, one of whose arms is received in the slot 84, another in the slot 85, and the remaining arm has a pin 89.

A link 90 connects pins 89 and 91 without any lost motion. The link 92 has slots 93 and 94 through which the pins 83 and 89 pass. The link 95 has slots 96 and 97 through which pass the pins 81 and 83. To the pin 81 is connected a pull bar 98 having a lug 99 adapted to be hooked over a pin 100, as shown in Fig. 24, when it is desired to start the apparatus initially or when the ice cream freezer is to be used. At all other times the bar 98 remains unhooked, as shown in Figs. 12, 13, 22 and 23. When the bar 98 is pulled, it immediately raises the ice cream controller valve 56 through bell crank lever 80 and connections 79, thereby permitting circulation of the expanded air through coil 12. The bar 98, through the engagement of pin 81 (Fig. 25) with link 95, pulls upon pin 83, thereupon turning bell crank 82 to the position shown in Fig. 24, thus raising water control valve 68, starting the water circulation in the cooling pot. The foregoing action does not, however, affect piston 73, valve 57, or piston 75, due to the provision of slots 93, 94. If, now, the piston 73 should rise, as shown in Fig. 23, the three-armed crank 88 is rocked, but the pins 83 and 89 only travel idly in the slots 93 and 94 and no change in the position of valves 56 and 68 occurs. Such rise of piston 73, under the foregoing conditions would, however, by rocking bell crank 88, cause pin 89 to pull link 90 and thereby rock bell crank 86, thereby raising valve 57 and permitting circulation of the expanded air in refrigerating coil 9. Under the foregoing conditions, no movement of piston 75 would occur as the arm of bell crank 88 moves idly downward in slot 85 (Figs. 23, 24). It will be seen, therefore, that the ice cream freezer can be started independently of the operation of the refrigerating part of the system and conditions in chamber 7.

If the ice cream freezer is not in use, as in Figs. 12, 13, 22, and the thermostat 76 should bring about conditions causing piston 73 to rise, no effect would be had on valve 56 which would remain in its lowered and cutoff position because, while the rise of piston 73 rocks bell crank 88 which pushes link 92 to the left (Fig. 26) and rocks bell cranks 82 and 86, thereby raising valves 57 and 68, nevertheless, the slots 96 and 97 afford the requisite lost motion to prevent any pressure on pin 81. Therefore, the refrigerating coil 9 can be automatically controlled independently of the control of the ice cream freezer coil 12. If the piston 75 is pushed down, due to air leakage and the operation of the air pressure difference maintainer, the bell crank 88 will be rocked to the position shown in Fig. 23, but no effect on piston 73 will occur on account of the slot 84. The pistons 57 and 68 will be raised, however, the same as if operated by piston 73, but without effect on valve 56 for reasons previously set forth.

*Electric switches.*—The valves 56, 68 and 57 are respectively pushed downwardly in their cylinders by springs 101, 102, 103. The stem of water valve 68 has a suitable connection to switch 4 which is carried by the switchboard 104. On switchboard 104 is a battery switch 105 (Figs. 12, 13, 33) which controls the circuits 106, 107, 108 of the thermostat 76 and the electromagnetic valve 77. This switch is adapted to open the circuit of one of the electromagnet coils after energization thereof, thereby preventing exhaustion of the battery, if a battery is used, or, if a power or light circuit is employed, to prevent the burning out of the electromagnet coils after they have reversed the valve 77.

*Compressor unloader.*—Referring to Figs. 12, 13, 16, 28, 29 and 33, there is connected to a squared part of the stub pivot pin 109 of rocker 82 an arm 110 (dotted lines, Figs. 12, 13, 29) of the unloader 111 of compressor 1. The rotary tubular unloader valve 112 (Figs. 1, 30, 31) controls a port 113 which opens into chamber 24 and is rotated by a spindle 114 carrying pinion 115. Slidable in the shell of the unloader is a racked tube 116 meshing with pinion 115 and actuated by a spring 117. A stem 118 is secured to the tube 116 and projects loosely from the shell or case of the unloader. Carried by the arm 110 is a pawl or detent 119 which is adapted to engage the end of stem 118 when the arm 110 moves downwardly and to depress the tube 116. When depressed, the detent or pawl finally engages the casing and being kicked or forced off of the stem 118 by such engagement, the spring 117 thereupon forces the tube 116 upwardly from the position shown in Fig. 28. An adjustable valve 120 controls port 121 which lets off the air in the unloader as slowly as it is desired when the spring 117 is returning the tube 116 upwardly as when the valve 112 is slowly closing after being opened by the downward movement of arm 110. The tube 116 has ports 122 which equalize the air pressure so that no air cushion will oppose the downward movement of the tube 116 when the valve 112 is opened. Normally, the arm 110 is in the raised position shown by dotted lines in Fig. 12, but when the rod 98 is pulled by hand, or either of the pistons 73, 75 is automatically operated, the rocker 82 being swung, the arm 110 moves to the dotted line position of Fig. 13 and the full line position of Fig. 28, thereupon forcing the tube 116 downwardly, and turning the valve 112 from the position shown in Fig. 30 to the position shown in Fig. 31 to afford full communication between the hollow interior of the valve and the port 113. This results in relief of the air in compression chamber 25 inasmuch as the air, during the first few strokes of the piston 26 passes into chamber 24 and the formation of an air cushion to resist the descent of the piston 26 is thereby prevented, but immediately the pawl 119 strikes the casing of the unloader, the coaction of the arm 110 and the stem 118 ceases and the stem 118 being free, it is forced upwardly by spring 117, the valve 112 being turned back to the position shown in Fig. 30, whereupon compression of the air in cylinder 25 occurs. By thus unloading the compressor, small resistance is offered to the starting of the motor 2 when the main switch 4 is thrown in to close the circuit, which operation occurs upon the turning of rocker 82 to the position shown in Fig. 13. The temperature piston 73 is wholly controlled by the thermostat 76 and the electromagnetic valve 77, the latter being shown at the bottom of Figs. 20 and 21. The pressure difference piston 75 is solely controlled by the pressure difference maintainer shown at the top of Figs. 20 and 21.

*Temperature piston and thermostatic control.*—The port 123 in block 49 leads to the top of the cylinder 72 and a port 124 leads to the bottom thereof, these ports having lateral branches which open into the valve cylinder or chamber 125 of the valve chest 126 which is suitably secured to the face of block 49. Electric solenoids 127 and 128 are connected to the ends of the valve chest 126, and suitably incased in any preferred manner. The said solenoids (Fig. 33) are in the respective circuits 106 and 107 which have the common battery circuit 108 and, according to whether the thermostat 76 closes one or the other of said circuits, one or the other of said solenoids is energized. The solenoids control a piston valve 129 to which the armatures 130 and 131 are connected. When the piston valve is in the position shown in Figs. 20 and 33, the high pressure air in well 34 of the cooling pot has access via port 123 to the top of piston 73, the low pressure air then having access to the outer faces of both of the piston heads and to the port 124 via the port 132 which extends through the piston valve and opens out at opposite ends thereof. When, however, the thermostat 76 closes the circuit through solenoid 127, the valve 129 is shifted to the position shown in Fig. 21, whereupon conditions are reversed, the low pressure air having access through port 123 to the top of piston 73 and the high pressure air passing into port 124 and thence to the bottom of piston 73, whereupon the high pressure air previously above piston 73 enters the low pressure part of the system and the piston acts without opposing air cushion and is lifted by the high pressure air to the position shown in Fig. 13, whereas it was formerly in the position shown in Fig. 12.

The block 48 on the cooling pot has a port 133 (Figs. 9 and 10) and the block 49 (Figs. 12, 13) has a port 134 which communicates therewith, the latter leading to the channel or port 135 which is thereby constantly supplied with high pressure air from well 34 of the cooling pot. The port 135 has two branches 136, 137, the former supplying high pressure air to the space between the heads of valve 129 by outlet 138 and the port 137 supplying high pressure air for the use of the pressure difference maintainer 78. Low pressure air from the cooling pot is constantly supplied to cylinder 55 which has a port 139 leading to cylinder 125 and a port 140 leading to the cylinder 141 of the pressure difference maintainer. When valve 129 is in the position shown in Fig. 20, low pressure air passes via port 132 to the bottom of cylinder 72 and high pressure air passes via ports 136 and 138 to the top of cylinder 72. When in the position shown in Fig. 21, low pressure air passes via port 123 to the top of temperature piston 73 and high pressure air passes via ports 136 and 138 to port 124 to the bottom of piston 73, thereby pressing said piston upwardly to the position shown in Fig. 13.

*Air pressure difference maintainer.*—Operating in the cylinder 141 of air pressure difference maintainer 78 (Figs. 20, 21, 33) is a piston valve 142 which has three piston heads and is provided with a port 143 opening out through the right hand end thereof and laterally between two of the heads; also another port 144 opening out of the surface of the opposite end of the piston and between the space of the remaining two heads. These ports, in connection with the heads, control the passage of the high and low pressure air to opposite ends of the piston valve 142. The port 140 constantly admits low pressure air to the left hand end of the piston valve 142 and the port 137 constantly supplies high pressure air from 135 to the space between two of the heads of said piston valve, as indicated at 145. Connected to the piston valve 142 is a stem 146 which is pressed toward the right by a spring 147 when conditions permit. At the left hand end of the stem 146 is a snap catch 148 which may be of any preferred construction, whose function is to hold the stem 146 and valve 142 against the action of spring 147 even when air pressure difference conditions approach the point where the spring 147 will act to force the piston valve to the position shown in Fig. 21 until, finally, the resistance of the said snap catch 148 is overcome and the spring 147 snaps the stem and piston valve to the right. The only purpose of the device 148 is to insure the retention of the stem 146 and valve 142 in the extreme positions shown in Figs. 20, 21, until other conditions are such that the spring 147 on the high pressure at the right hand end of piston valve 142 snaps the valve instead of allowing it to move gradually.

The air pressure difference maintainer is independent of the action of the thermostat 76 and is used to compensate for air leakage in the system, a condition which is difficult to prevent in any air pressure system. When the predetermined or working difference of the high and low air pressures in the system is lowered so that these two air pressures approach too closely to each other to afford a sufficient pressure difference to operate the temperature piston 73, it is obvious that it is necessary to start the air compressor 1 to build up the high pressure and restore the air pressure difference, for without a sufficient air pressure difference the springs 102 and 103 would offer too great resistance to the ascent of piston 73. The air pressure difference piston 75 is therefore employed and this piston alone is controlled by the air pressure difference maintainer 78. Ports 149 and 150 lead to the upper and lower parts of cylinder 74 and are respectively in communication with the cylinder 141, but according to the position of the piston valve 142, the high or low pressure is admitted to a given end of the cylinder 74. Under normal conditions of operation, when the air pressure difference is sufficient to operate temperature piston 73, the piston valve 142 is in the position shown in Fig. 20, because the high pressure air passes via port 137, opening 145 and port 143 to the right hand end of the piston valve 142, thereby forcing said piston to the left against the action of spring 147. The high pressure air being thus admitted to the lower end of cylinder 74, the piston 75 remains in the position shown in Figs. 12 and 13 and, owing to the existence of slot 85, the temperature piston 73 and the piston valves 56, 68 and 57 may operate as previously described. At the same time low pressure air admitted from 55 through port 140 has access to port 144 and to port 149, thence to the top of piston 75. When, however, through air leakage in the system, the high and low air pressures approach each other more closely than the predetermined minimum air pressure difference, the tension of spring 147 is such that it overcomes the high pressure air acting on the right hand end of piston 142 and snaps the piston valve 142 to the position shown in Fig. 21. When this occurs, the high pressure air previously in port 150 is now admitted from opening 145 to port 149 and to the top of piston 75, thereby forcing the latter downward in its cylinder 74. At the same time low pressure air always has access to port 144, and is placed in communication with port 150 and passes to the bottom of the piston 75. The descent of piston 75, under the action of the high pressure air, pulls down on the three-armed lever 88 and lifts the piston valves 57 and 68 just as they are lifted by the temperature piston 73 without affecting piston 73 on account of the provision of slot 84. Consequently, the air circulation in coil 9 and the water supply are both resumed. Further, the ascent of piston valve 68 closes the switch 4 and starts the motor 2 which, through the operation of the compressor, builds up the high pressure and restores the pressure difference. When this occurs, the increase of pressure of the high pressure air acting through port 143 forces the piston valve 142 to the position shown in Fig. 20, whereupon the relation of the high and low air pressures to piston 75, is reversed, and the said piston is again forced to the position shown in Figs. 12 and 13, thereby permitting the springs 102 and 103 to lower the piston valves 68 and 57.

Referring to Figs. 32 and 33, the primer valve 14 is subject to low pressure air supplied through a pipe 151 which may be connected to any part of the low pressure system as, for instance, the pipe 42.

*General operation*, (Fig. 33.)—When the compressor is initially started, the primer valve 14 will be in position to admit atmospheric air through port 19 into the priming cylinder 20, or, if the low pressure air drops below a certain pressure, it will be insufficient to force back the priming valve 14 and also in that event, the spring 16 will position the priming valve as in Fig. 32 to admit air to the priming cylinder 20, assuming that piston 21 is in its lower position. When the piston rises, the primed and compressed air passes from cylinder 20 through pipe 23 into suction chamber 24 and thence into compression cylinder 25 and on the descent of the piston 26 the air is compressed in cylinder 25 and finally under suitably high pressure, say 150 lbs., the air is forced out through valve 29 into compression chamber 28 and thence into pipe 30, then passing through coil 31 where it is cooled by the water in the chamber 33 of the cooling pot. The high pressure air finally passes into well 34 and in its cooled condition back through pipe 36 into the expander head 37. The temperature of the air, after circulating through coil 31, is almost as low as that of the cooling water. As will appear subsequently, the high pressure air, when passing through well 34, is also subjected to the cooling action of the expanded air which exists in compartments 46 and 47. The cooled high pressure air passes from expander chamber 37 through valve 39 and into the expansion cylinder 27, where it expands and by its expansive action on piston 26, assists the motor 2 in operating the said piston. The air expanding in cylinder 27 becomes very greatly cooled, due to its expansion so that when the piston 26 has descended far enough to permit the expanded air to pass into the expansion chamber 40, the temperature of the expanded air is considerably below the freezing point. Having expanded, the previous high pressure of the air is very greatly lowered say, to less than one-half of its previous high pressure and it passes into pipe 42 as expanded low pressure air. If the valve 56 is raised, as previously has been explained, the expanded low pressure air circulates through ice cream freezer coil 12, or, this coil may be used to actually freeze ice. After passing from coil 12, the expanded air enters compartment 46 of the cooling pot via pipe 44, where its low temperature is utilized to cool the high pressure air in well 34. From compartment 46, the expanded air flowing from coil 12 passes into the port 52 and into port 58, finally entering the chamber 24 through pipe 59 and is recompressed and again forced out as high pressure air into pipe 30. If the valve 56 has not been raised by hand, by pulling upon the bar 98, there will be no circulation through the coil 12. The expanded and cooled air also passes into coil 9 and circulates through said coil in the event of the piston valve 57 having been raised either by the temperature piston 73 or the air pressure difference maintainer piston 75. The expanded cool air flows from coil 9 of the refrigerating chamber 7, through pipe 45 and into compartment 47 where its low temperature is availed of to cool the high pressure air in well 34. The expanded low pressure air finally passes from chamber 47 through port 51 into port 53 and out through port 60 into pipe 59 for recompression in cylinder 25.

The water circulation in chamber 33 only occurs when the piston 68 is raised, which action occurs either upon pulling the rod 98 to circulate the air in coil 12, or, on the operation of either of the pistons 73 or 75. The control of air circulation through coil 12 and of water circulation in chamber 33 is solely dependent upon the operation of pull rod 98 except that the water circulation is also started whenever either of the pistons 73, 75 operates.

The temperature in refrigerating chamber 7 determines the action of the thermostat 76. The thermostat 76 may be set to close the circuits 106, 107, at any predetermined high and low temperatures but, preferably, to limit the fluctuations of temperature to only a few degrees. For instance, the thermostat may be adapted to close the circuit 107 when the temperature in chamber 7 drops to 35° and, on the other hand, to close the circuit 106 when the temperature rises to 40°. When the temperature in chamber 7 rises sufficiently to close circuit 106, the piston 73 will be in its lowered position and the valves 56, 68 and 57 closed, because a suitable temperature has previously existed in chamber 7 and no occasion has arisen for operating the air compressor. The switch 4 is then open, but the battery switch 105 completes the circuits 106 and 108 except for their completion at the thermostat. The temperature having risen sufficiently in chamber 7, the thermostat closes the circuit 106, whereupon the solenoid 127 of electromagnetic valve 77 is energized, immediately pulling the piston valve 129 to the left, as shown in Fig. 21. The high pressure air which previously acted on the top of piston 73 is now applied to the bottom of said piston and the low pressure air to the top of said piston, whereupon the piston 73 rises and opens valves 57 and 68, starting the expanded air circulation through the refrigerating coil 9 and the water circulation in chamber 33, at the same time closing switch 4 and completing the circuit 107, 108 through battery switch 105 but not through the thermostat 76. The unloader 111 is also operated to unload the air compressor by placing the compression cylinder 25 in communication with the suction chamber 24. The compressor having been started into operation by its motor 2, and the unloader having dropped, the unloader valve resumes its normal position and the high pressure begins to build up and is forced through pipe 30, coil 31, pipe 36 and into expander cylinder 27 where it expands and as cooled, expanded low pressure air, passes into pipe 42 and thence to coil 9.

The operation of the air compressor having caused circulation of the cooled, expanded air in coil 9, the temperature of chamber 7 will finally drop and the thermostat will tend to move to close circuit 107, 108. The piston 73 and the valves 57 and 68 will remain in their raised positions and the compressor continue its operation until the thermostat closes the circuit 107 which it will do when the temperature drops to the predetermined low. When the predetermined low temperature is reached in chamber 7, the thermostat will close circuit 107, thereby energizing solenoid 128 which will pull valve 129 to the position shown in Fig. 33, and by applying high pressure air to the top of piston 73, permit the springs 102 and 103 to restore the valves 57 and 68 to closed position, whereupon the circuit 106, 108 is completed by battery switch 105 and the motor switch 4 is opened so that the compressor stops. When the system is idle, if such leakage occurs as to cause the air pressure difference to become too low at any time, the spring 147 will force the piston 142 to the right, whereupon high pressure air which previously held piston 75 in raised position will now be admitted to the top of said piston and force it down, thereupon lifting the valves 57 and 68 and establishing air circulation in coil 9 and water circulation in chamber 33.

Referring to Fig. 34, I have shown how the ice cream freezer and its coil 12 may be dispensed with. In doing this, I omit the valve 56, the cylinder and port for said valve, the pull rod 98, the valve 57 and the compartment 46 of the cooling pot 32 and use but one compartment 47 which is the one into which the expanded air from refrigerating coil 9 passes. In all other respects, the operation of the system is the same. I do not, therefore, limit myself to the use, except where set forth in the claims, of the ice cream freezer coil 12 and the valves and appliances which are used in connection therewith.

Having thus described my invention, what I claim as new and desire to secure by Letters Patent, is:—

1. The combination with an air circulating refrigerating system, employing high and low air pressures, and a source of supply therefor, of means automatically operated by the air pressure difference between the "high" and "low" parts of said system adapted to control the air pressure supply and circulation of said system.

2. The combination with an air circulating refrigerating system, employing high and low pressures, of air compressing and expanding means adapted to supply the high and low pressures for the system, and means automatically operated by the air pressure difference between the "high" and "low" parts of said system adapted to control the operation of the air compressing and expanding means and the circulation of said system.

3. The combination with an air circulating refrigerating system, employing high and low pressures, of a motor driven air compressor and expander adapted to supply the high and low pressures for the system, a power controller for said motor, and means automatically operated by the air pressure difference between the "high" and "low" parts of said system adapted to operate said power controller.

4. The combination with an air circulating refrigerating system, employing high and low pressures, of an electric motor driven air compressor and expander adapted to supply the high and low pressures for the system, a switch for controlling said electric motor, and means automatically operated by the air pressure difference between the "high" and "low" parts of said system adapted to open and close said switch.

5. The combination with an air circulating refrigerating system employing high and low pressures and a water circulating cooling system, of means automatically operated by the air pressure difference between the "high" and "low" parts of said system adapted to automatically control the water circulation.

6. The combination with an air circulating refrigerating system employing high and low air pressures and a water circulating cooling system, of a source of supply for the water circulating system, and means automatically operated by the air pressure difference between the "high" and "low" parts of said air circulating system adapted to automatically control the air pressure supply and also the water circulation.

7. The combination with an air circulating refrigerating system, of a source of air supply therefor, a controller operated at different times by variations in the air pressure of said system to regulate the air pressure supplied to said system, and thermostatically controlled means for operating the said controller independently of its normal control by air pressure variations.

8. The combination with an air circulating refrigerating system, and a water circulating cooling system, of sources of supply for said air and water circulating systems, a controller operated at different times by variation in the air pressure of said system to jointly regulate the air pressure supplied to said system and the water circulation in the cooling system, and thermostatically controlled means for operating the said controller independently of its normal control by air pressure variations.

9. The combination with an air circulating refrigerating system, of a thermostat, and means controlled by said thermostat which utilizes the air pressure variations in said system to control the air circulation in said system.

10. The combination with an air circulating refrigerating system employing high and low pressures, of a motor driven air compressor and expander adapted to supply the high and low pressures for the system, and thermostatically controlled means adapted to utilize the air pressure difference of said system to control the operation of the compressor and the air circulation in said system.

11. The combination with an air circulating refrigerating system employing high and low pressures, of a motor driven air compressor and expander adapted to supply the high and low pressures for the system, a water circulating cooling system, and thermostatically controlled means adapted to utilize the air pressure difference of said system to control the water circulation and also the motor and the air circulation.

12. The combination with an air circulating refrigerating system employing high and low air pressures, and a source of supply therefor, of means automatically operated by the air pressure difference between the "high" and "low" parts of said system adapted to control the air pressure supply and circulation of said system, and thermostatically controlled means also adapted to control the air pressure supply and air circulation of said system.

13. The combination with an air circulating refrigerating system employing high and low air pressures, and a source of supply therefor, of means automatically operated by the air pressure difference between the "high" and "low" parts of said system adapted to control the air pressure supply and circulation of said system, a water circulating cooling system, and thermostatically controlled means adapted to control the circulation of said water system.

14. The combination with an air circulating refrigerating system employing high and low pressures, of a motor driven air compressor and expander adapted to supply the high and low pressures for the system, a power controller for said motor, means automatically operated by the air pressure difference between the "high" and "low" parts of said system adapted to operate said power controller, and thermostatically controlled means also adapted to operate said power controller and to control the air circulation.

15. The combination with an air circulating refrigerating system employing high and low pressures, of a motor driven air compressor and expander adapted to supply the high and low pressures for the system, a power controller for said motor, means automatically operated by the air pressure difference between the "high" and "low" parts of said system adapted to operate said power controller, a water circulating cooling system, and thermostatically controlled means also adapted to operate said power controller and to control the water circulation.

16. The combination with an air circulating refrigerating system employing high and low pressures, of a motor driven air compressor and expander adapted to supply the high and low pressures for the system, a power controller for said motor, means automatically operated by the air pressure difference between the "high" and "low" parts of said system adapted to operate said power controller, a water circulating cooling system subject to the control of the automatic means last named, and thermostatically controlled means adapted for operating the power controller and for controlling the air and water circulation.

17. The combination with an air circulating refrigerating system, of a motor driven air compressor for supplying air to said system, an unloader for said compressor, and thermostatically controlled means adapted for operating said unloader and for controlling the operation of the compressor.

18. The combination with an air circulating refrigerating system employing high and low pressures, of a motor driven air compressor for said system, an unloader for said compressor, and means automatically operated by the air pressure difference between the "high" and "low" parts of the system adapted to control the operation of the compressor and to operate the said unloader.

19. The combination with an air circulating refrigerating system employing high and low pressures, of a motor driven air compressor for said system, an unloader for said compressor, means automatically operated by the air pressure difference between the "high" and "low" parts of the system adapted to control the operation of the compressor and to operate the said unloader, and thermostatically controlled means adapted to control the operation of the compressor independently of the control thereof by the air pressure difference operated means aforesaid and which also operates the unloader.

20. The combination with an air circulating refrigerating system, of a motor driven air compressor for supplying air to said system, an unloader for said compressor, and manually controlled means for operating said unloader and for controlling the operation of the compressor.

21. The combination with an air circulating refrigerating system, of a motor driven air compressor for supplying air to said system, an unloader for said compressor, manually controlled means for operating said unloader and for controlling the operation of the compressor, and thermostatically controlled means adapted to operate the unloader and to control the operation of the compressor independent of the control of the unloader and compressor by the manually operated means aforesaid.

22. The combination with an air circulating refrigerating system, of a motor driven air compressor for supplying air to said system, an unloader for said compressor, manually controlled means for operating said unloader and for controlling the operation of the compressor, and air pressure difference operated means adapted to automatically operate the unloader and to control the compressor independently of the control of the unloader and compressor by the manually operated means aforesaid.

23. The combination with an air circulating refrigerating system, of a motor driven air compressor for supplying air to said system, an unloader for said compressor, manually controlled means for operating said unloader and for controlling the operation of the compressor, thermostatically controlled means for operating the unloader and for controlling the operation of the compressor, independently of the control thereof by the manually operated means aforesaid, and pressure difference operated means for operating the unloader and controlling the operation of the compressor independent of the control thereof by the thermostatic means and the manually operated means aforesaid.

24. The combination with an air circulating refrigerating system, of a motor driven air compressor for supplying air to said system, a water circulating cooling system for the air system, and manually operated means for simultaneously controlling both the air and water circulation.

25. The combination with an air circulating refrigerating system, of a motor driven air compressor for supplying air to said system, manually operated means for controlling the air circulation, and thermostatically controlled means for controlling the air circulation.

26. The combination with an air circulating refrigerating system, of a motor driven air compressor for supplying air to said system, manually operated means for controlling the air circulation, and pressure difference operated means controlling the air circulation independently of the control thereof by the manually operated means aforesaid.

27. The combination with an air circulating refrigerating system, of a motor driven air compressor for supplying air to said system, manually operated means for controlling the air circulation, pressure difference operated means for controlling the air circulation, and thermostatically controlled means for controlling the air circulation, all of said means being adapted for independent action.

28. The combination with an air circulating refrigerating system, of a motor driven air compressor for supplying air to said system, a water circulating cooling system for the air system, manually operated means for simultaneously controlling both the air and water circulation, and thermostatically controlled means for controlling the circulation of both the air and water independently of the manual control aforesaid.

29. The combination with an air circulating refrigerating system, of a motor driven air compressor for supplying air to said system, a water circulating cooling system for the air system, manually operated means adapted to simultaneously control both the air and water circulation, and pressure difference operated means for controlling the circulation of the air and water independently of the manual control aforesaid.

30. The combination with an air circulating refrigerating system, of a motor driven air compressor for supplying air to said system, a water circulating cooling system for the air system, manually operated means adapted to simultaneously control both the air and water circulation, pressure difference operated means for controlling the air and water circulation, and thermostatically controlled means for controlling the air and water circulation, the manual, pressure difference operated, and thermostatic, means all being adapted to operate independently.

31. The combination with an air circulating refrigerating system employing high and low air pressures, of an air compressor for supplying high and low pressure air to said system, means operated by the air pressure difference controlling the air circulation and supply, and a primer for said compressor which is automatically controlled by the low pressure of the air circulating refrigerating system, whereby when said low pressure drops beyond a predetermined amount, air is supplied by the primer to the compressor.

32. An unloader for air compressors having, in combination, a cylinder, a spring actuated piston operable therein, an unloader valve controlled by said piston, and tripable operating means adapted for disengageably actuating said spring actuated piston, whereby the valve is opened by direct action and closed when the piston is released.

33. An unloader for air compressors having, in combination, a cylinder, a spring actuated piston operable therein, an unloader valve controlled by said piston, an actuating member adapted to engage and operate the piston stem and provided with a pawl or detent adapted to be tripped after such engagement, whereby the valve is opened by direct action and is allowed to close on the release of the piston.

34. The combination with an air circulating refrigerating system employing compressed and expanded air, of a cooling pot having a water compartment, an expanded air compartment, and a high pressure air circulating device, the high pressure air circulating device and the expanded air compartment being arranged so that they will be subject to the cooling action of the water and the high pressure air circulating device will also be subject to the cooling action of the expanded air in the expanded air compartment.

35. The combination with an air circulating refrigerating system employing compressed and expanded air, of a cooling pot having a water compartment, an expanded air compartment, and a high pressure air compartment, and a coil subject to the cooling action of the water in its compartment and also communicating with the high pressure air compartment aforesaid, the aforesaid coil and compartments being arranged so that the high pressure air is subject to the cooling action of both the water and the expanded air.

36. A controlling mechanism for fluid circulating systems having independent manually operable valves and a fluid operated piston adapted for operating one of said valves independent of the manual operation of said valve.

37. A controlling mechanism for fluid circulating systems having independent manually operable valves and a fluid operated piston adapted for operating one of said valves independent of the manual operation of said valve, and a motive power controller operated by the valve last named.

38. A controlling mechanism for fluid circulating systems having, in combination, a valve and independent fluid operated pistons subject to independent control which are adapted to individually operate said valve without interference with each other's action.

39. A controlling mechanism for fluid circulating systems having, in combination, independent valves, and a fluid operated piston adapted for operating said valves in conjunction.

40. A controlling mechanism for fluid circulating systems having, in combination, independent valves, and independent fluid operated pistons subject to independent control which are adapted to individually operate said valves in conjunction but without interference between the operation of said valves by the respective pistons.

41. In a controlling mechanism for fluid circulating systems, the combination with a valve, of a fluid operated piston adapted to operate said valve, and an electromagnetically controlled valve which controls the admission of fluid to the said piston.

42. In a controlling mechanism for fluid circulating systems, the combination with a valve, of a fluid operated piston adapted to operate said valve, an electromagnetically controlled valve which controls the admission of fluid to the said piston, and a thermostat controlling the operation of the electromagnetic valve.

43. In a controlling mechanism for fluid circulating systems, the combination with a valve, of a piston for operating said valve, said piston being subject to admission of fluid pressure to its opposite faces, a source of fluid pressure, and a fluid pressure reversing valve for controlling the admission of fluid pressure to opposite faces of the piston.

44. In a controlling mechanism for fluid circulating systems, the combination with a valve, of a piston for operating said valve, said piston being subject to admission of fluid pressure to its opposite faces, a source of fluid pressure, a fluid pressure reversing valve for controlling the admission of fluid pressure to opposite faces of the piston, independent electromagnets for controlling the movements of the reversing valve, and means for energizing said electromagnets independently of each other.

45. In a controlling mechanism for fluid circulating systems employing high and low pressures, the combination with a valve, of a piston for operating said valve and which is subject to the admission of high pressure on one of its faces and low pressure on its other face, and a pressure reversing valve automatically controlled by the difference in pressure between the high and low pressures of the system which controls the application of high and low pressure to the valve operating piston aforesaid.

46. In a controlling mechanism for fluid circulating systems employing high and low pressures, the combination with a valve, of a piston for operating said valve and which is subject to the admission of high pressure on one of its faces and low pressure on its other face, a pressure reversing valve automatically controlled by the difference in pressure between the high and low pressures of the system which controls the application of high and low pressures to the valve operating piston aforesaid, another piston for operating the said valve independently of the control thereof aforesaid, said last-named piston being also subject to the application of high and low pressures to its faces, and an electromagnetically controlled reversing valve for controlling the application of high and low pressures to the piston last-named, whereby the respective pistons are adapted to operate the valve first-named independently of each other, one by pressure difference control and the other by electromagnetic control.

47. The combination with a piston valve having heads and an intermediate neck of lesser diameter and provided with a port extending lengthwise of the valve and having mouths opening out beyond the outer faces of said heads, of a cylinder having ports one of which is always in communication with the port aforesaid to supply pressure thereto, and other ports in the cylinder, one of which is a supply port, which are alternately placed in communication with the supply port according to the position of the valve.

48. A pressure difference controlled valve consisting of the combination of a spring actuated piston valve, ports for supplying high and low pressures to opposite faces of said piston valve arranged to supply the higher pressure in opposition to the action of the spring on said piston valve, and ports controlled by the movements of said valve which are adapted, in turn, to direct the high and low pressures to points of use and to reverse the direction of such high and low pressures according to the position of the piston valve.

In testimony whereof, I hereunto affix my signature in presence of two witnesses.

CARL A. V. CARLSSON.

Witnesses:
S. V. LOCKWOOD,
A. M. PASKILL.